L. H. STEWART.
PROCESS FOR CANNING AND PRESERVING FRUIT.
APPLICATION FILED JUNE 12, 1913.
1,099,577.     Patented June 9, 1914.
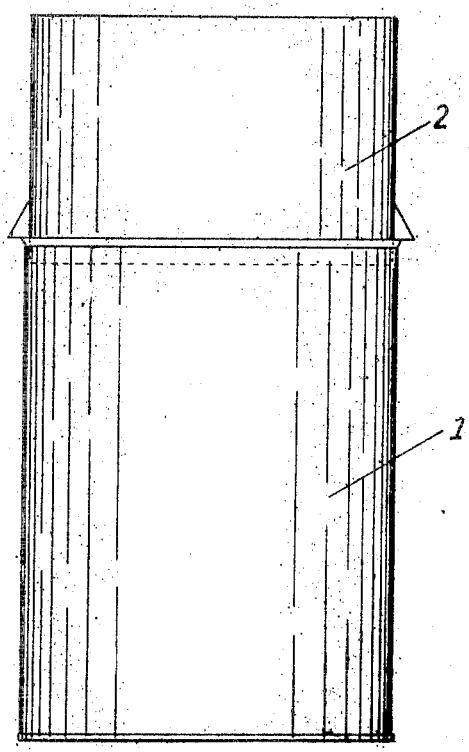
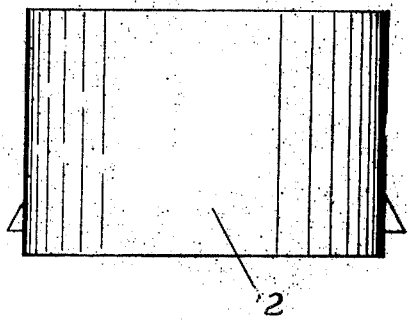

UNITED STATES PATENT OFFICE.

LEWIS HENRY STEWART, OF SACRAMENTO, CALIFORNIA.

PROCESS FOR CANNING AND PRESERVING FRUIT.

1,099,577. Specification of Letters Patent. Patented June 9, 1914.

Application filed June 12, 1913. Serial No. 773,265.

*To all whom it may concern:*

Be it known that I, LEWIS HENRY STEWART, a citizen of the United States, residing at Sacramento, in the county of Sacramento and State of California, have invented new and useful Improvements in Processes for Canning and Preserving Fruit, of which the following is a description.

In the preservation of fruit, and especially berries, such as strawberries, etc., it has been customary in factory canning to place the fruit in the container in which it is finally to be offered for sale, filling the container with the fruit as completely as possible, completing the filling of the cans with syrup composed of sugar and water, placing the filled cans in an "exhauster" or steam box, and, when sufficiently hot, sealing, and finally reheating.

The result of canning or preserving by the above method is that it is impossible to obtain a full can of the fruit on account of the wilting or shrinking which takes place when the same is subjected to the action of heat or steam; and secondly, that a discoloration is effected, especially in strawberries, due to the presence of water other than that inherent in the fruit; and thirdly, a reduction in the flavor or aroma due to the addition of an extraneous liquid.

The object of the present invention is to overcome the difficulties pointed out above in the method of canning and preserving fruit, and especially berries, such as strawberries.

My invention therefore consists in the novel process set forth and described hereinafter and particularly pointed out in the claims.

While strawberries have been especially mentioned as susceptible to this process, this fruit is mentioned merely as an illustration, and it is to be understood that I do not limit the process to any one kind of fruit.

In carrying out the details of my invention, I use, in addition to the can or container in which the fruit is to be preserved, an extension piece similar to that shown in the drawings, in which 1 is a container such as used in factory canning and commonly known as a "sanitary can."

2 is an extension piece which temporarily serves as a retainer for excess fruit, further reference to which will be made later.

Before beginning operations, I ascertain the approximate weight of water which a can of the size to be employed will hold. Knowing this, a certain weight of strawberries, or other fruit, and a certain weight of granulated sugar are proportioned, (the amount of sugar depending on the condition and character of the fruit and the percentage of sugar desired in the syrup), so that the combined weight of the fruit and the sugar will equal approximately the previously ascertained weight. It will be found that fresh fruit, particularly strawberries, will be too bulky to be placed in the container of the selected size without crushing; therefore I employ an extension piece as shown in Fig. 2 placed in the open end of the container, see Fig. 1. The fruit to be preserved having been stemmed, washed, drained and otherwise prepared for the can, is placed in this combined receptacle to the weight previously ascertained, and sugar of the weight also previously ascertained is placed on the top of the fruit, and the whole subjected to the heating process of an "exhauster" or steam box for from five to twenty minutes, or such time as will reduce the bulk of the fruit to the capacity of the selected container and at the same time cause the sugar to unite with the juice of the fruit itself forming a syrup of proper consistency and sugar-percentage without the presence of any extraneous liquid. The extension is then removed, a top seamed on the container, and the contents again reheated.

In specifying five to twenty minutes as the time necessary for the first heating, I wish to say that this will vary according to the kind of fruit to be preserved and also its condition as to ripeness.

It will be seen by this process, with the least amount of handling, is obtained a full can of preserved fruit with a syrup containing no other liquid than that supplied by the fruit itself; also the color of the fruit will be found to be practically unchanged and the aroma or flavor retained to its fullest extent.

Having described the process, what I declare as new and desire by Letters Patent to secure, is—

1. The herein described process of canning and preserving fruit which consists in placing a sufficient quantity of prepared fresh fruit in and confining above a permanent container to just fill the same when reduced in volume by heat, adding sugar thereto, subjecting the whole to the action of heat for say five to twenty minutes or such time as is necessary to reduce the bulk of the fruit to the capacity of the container, hermetically sealing the container and reheating.

2. The herein described process of canning and preserving strawberries which consists in placing a sufficient quantity of prepared fresh berries in and confining above a permanent container to just fill the same when reduced in volume by heat, adding sugar thereto, subjecting the whole to the action of heat for say five to twenty minutes or such time as is necessary to reduce the bulk of the berries to the capacity of the container, hermetically sealing the container and reheating.

LEWIS HENRY STEWART.

Witnesses:
   FRED LEC FULLER,
   FRED FISCK.